US006892978B2

(12) United States Patent
Mewes et al.

(10) Patent No.: US 6,892,978 B2
(45) Date of Patent: May 17, 2005

(54) TAPE GUIDE FOR BIASING A TAPE PATH WITHIN A TAPE TRANSPORT SYSTEM, SUCH AS A DATA STORAGE TAPE CARTRIDGE

(75) Inventors: Michael A. Mewes, Fargo, ND (US); Christopher J. Zwettler, Lake Elmo, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/452,751

(22) Filed: Jun. 2, 2003

(65) Prior Publication Data

US 2004/0238669 A1 Dec. 2, 2004

(51) Int. Cl.[7] .............................................. G11B 23/087
(52) U.S. Cl. .................... 242/615.4; 242/346; 242/348
(58) Field of Search ............................. 242/338.4, 340, 242/342, 346, 346.1, 615, 615.1, 615.3, 348, 615.4; 360/132

(56) References Cited

U.S. PATENT DOCUMENTS

| | | | | |
|---|---|---|---|---|
| 1,839,064 A | * | 12/1931 | John ........................ 242/342 |
| 3,831,882 A | * | 8/1974 | Fitterer et al. .............. 242/346 |
| 5,251,844 A | * | 10/1993 | Albrecht et al. ......... 242/615.1 |
| 5,326,044 A | * | 7/1994 | Haller ...................... 242/346.1 |
| 5,377,927 A | * | 1/1995 | Erickson et al. ............ 242/346 |
| 5,893,526 A | | 4/1999 | Zwettler |
| 6,249,401 B1 | * | 6/2001 | Zwettler .................... 360/132 |
| 6,343,757 B1 | | 2/2002 | Zwettler |
| 6,457,664 B1 | * | 10/2002 | Zwettler .................... 360/132 |
| 6,563,670 B2 | * | 5/2003 | Brong et al. ................ 360/132 |

* cited by examiner

Primary Examiner—William A. Rivera
(74) Attorney, Agent, or Firm—Eric D. Levinson (57) ABSTRACT

A tape guide for limiting lateral tape movement within a tape transport system component, such as a data storage tape cartridge. The storage tape, having a tape width, extends between two tape reels along a tape path defined, at least in part, by the tape guide. The tape guide includes a tape contact face, a top flange and a one bottom flange. The tape guide is configured to define an effective tape path width between the top and bottom flanges that is less than the tape width. During use, the tape guide biases the tape path to minimize lateral motion of the storage tape.

20 Claims, 8 Drawing Sheets

TAPE GUIDE FOR BIASING A TAPE PATH WITHIN A TAPE TRANSPORT SYSTEM, SUCH AS A DATA STORAGE TAPE CARTRIDGE

THE FIELD OF THE INVENTION

The present invention relates to guidance of magnetic storage tape within a tape transport system including, for example, a data storage tape cartridge and/or a tape drive. More particularly, it relates to a tape guide adapted to provide a biased tape path for limiting lateral storage tape movement.

BACKGROUND OF THE INVENTIONS

Tape guides are employed to define a desired tape path within various tape transport system components, such as data storage tape cartridges, tape drives, etc. To this end, data storage tape cartridges have been used for decades in the computer, audio, and video fields. Due to their low cost and high storage capacity, data storage tape cartridges continue to be an extremely popular form of recording large volumes of information for subsequent retrieval and use.

One type of data storage tape cartridge consists generally of an outer shell, or housing, maintaining two tape reels, two or more discrete corner guides, and a length of magnetic storage tape. The storage tape is wrapped about and extends between the two tape reels. The separate corner guides, in turn, articulate the storage tape through a defined tape path. In this regard, the tape path typically extends across a head access window (or a read/write zone) formed in the housing. In particular, the corner guides are positioned at opposite sides of the head access window to direct the tape path through the head access window. These two corner guides are typically "compliant guides," each providing an arcuate guide surface and opposing tape edge (or lateral) stop surfaces, one of which is compliant. Any remaining corner guides or guide surfaces are positioned to direct the storage tape between the tape reels and the corner guides associated with the head access window. In addition, a door is normally associated with the head access window to provide selective access to the storage tape. With a single reel cartridge design, the storage tape is extended between the cartridge reel and a tape drive take-up reel along a tape path defined, at least in part, by one or more tape guides within the tape drive.

During use, the data storage tape cartridge is inserted into a tape drive. With a dual reel cartridge, the door is maneuvered into an open position and a transducer, such as a magnetic read/write head, engages the storage tape via the head access window. Alternatively, with a single reel design, the storage tape is driven from the cartridge and into the drive for interaction with the read/write head. Regardless, to ensure consistent, accurate engagement by the read/write head, the storage tape must be precisely positioned.

Various inherent design issues may compromise the desired, precise positioning of the storage tape across the read/write head. For example, the tape reel(s) may contribute to unexpected lateral (or edge-to-edge) tape movement. In this regard, the typical tape reel includes a central hub and opposing flanges. The storage tape is wrapped about the central hub and is laterally constrained by the hub flanges (i.e., the hub flanges limit lateral movement of the storage tape by contacting a respective top or bottom edge of the tape). However, to avoid contact with the storage tape edges, a slight opening taper to the hub flanges is provided. That is to say, an overall lateral spacing between the opposing flanges is greater than a width of the storage tape, typically on the order of 0.002–0.02 inch. As a result, during tape reel rotation, the storage tape may move laterally from flange to flange by as much as 500 micrometers. This is especially true during the data transfer mode in which the outermost layers of the storage tape are normally not tightly wrapped about the tape reel hub. In this case, a "slack" is developed in the storage tape, such that the storage tape easily moves laterally between the opposing flanges. This undesired lateral tape movement is "seen" by the head, leading to read/write errors.

The corner guides described above cannot readily correct undesired lateral tape movement. As previously described, the compliant tape guides typically incorporate opposing, transverse surfaces that redirect lateral tape movement. Consequently, lateral motion at the tape reel(s) can cause lateral motion at the read/write head because the complaint guide acts as a fulcrum for the tape path.

Any slight deviation, or lateral movement, from a desired planar position of the storage tape within the head access window can result in read/write errors. If the storage tape is slightly above or below an expected location, the read/write head will experience difficulty in finding a desired track on the storage tape. Additionally, the read/write head can encounter tracking problems where the head "loses" a desired track. Finally, recent improvements in storage tape media have increased the available track densities on the storage media, and subsequent lateral movements of the storage tape during the read/write process can result in increased read/write errors. Unfortunately, attempts to incorporate multiple, spaced tape guides within the cartridge and/or the tape drive so as to effectuate offset edge control have been less than successful due to unacceptable tape buckling along the unsupported span of storage tape between the distinct, spaced guides.

While the evolution of tape transport systems, including cartridge and tape drive components, has greatly improved performance, other concerns, including lateral tape movement, remain. Therefore, a need exists for a tape guide for use in a tape transport system, such as a data storage tape cartridge and/or a tape drive, configured to control lateral tape movement with minimal edge wear.

SUMMARY OF THE INVENTION

One aspect of the present invention relates to a data storage tape cartridge having a housing defining a head access window. First and second tape reels are rotatably disposed within the housing. A storage tape having a tape width extends between the first and second tape reels, and a tape guide is disposed within the housing to define a tape path of the storage tape across the head access window. The tape guide includes at least one top flange and at least one bottom flange. The tape guide is configured to define an effective tape path width between the top and bottom flanges that is less than the tape width. During use, the tape guide biases the tape path to minimize lateral motion of the storage tape.

Another aspect of the present invention relates to a tape guide for use in a tape transport system. The tape guide includes a guide portion, an arcuate tape contact face, a top flange and a bottom flange. The top and bottom flanges project from opposite sides of the tape contact face, with the top flange forming a top offset region and the bottom flange forming a bottom offset region. The offset regions combine to define an effective tape path width that is less than a width of the storage tape otherwise provided with the tape drive system. The tape guide can be assembled within a cartridge or a tape drive.

Yet another aspect of the present invention relates to a method of guiding a storage tape within a tape drive system. The tape drive system includes a read/write head. The method includes positioning a tape guide adjacent the read/write head. The tape guide includes a tape contact face, a top flange, and a bottom flange. The storage tape is articulated along the tape contact face such that the read/write head interacts with the storage tape. The tape path of the storage tape along the tape contact face is biased by causing the storage tape to contact the top and bottom flanges at staggered locations. In particular, relative to a direction of tape travel, the storage tape is forced to contact the top flange and the bottom flange, at staggered locations, in front of the read/write head.

DETAILED DESCRIPTION OF THE PREFERRED EMBODIMENTS

Figure 1:
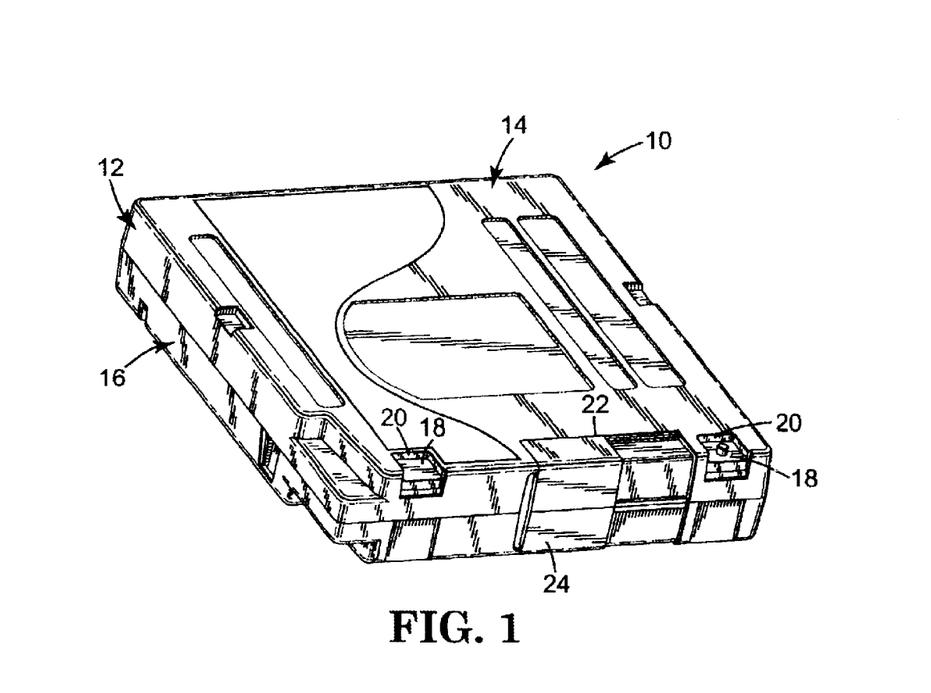
FIG. 1 is a perspective view of a data storage tape cartridge.

One embodiment of an exemplary data storage tape cartridge 10 is shown in FIG. 1. Generally speaking, the data storage tape cartridge 10 includes a housing 12 defined by a first housing section 14 and a second housing section 16. The data storage tape cartridge 10 further includes a base plate 18, a portion of which is exposed through the recesses 20 in the first housing section 14. Remaining components of the data storage tape cartridge 10 are described in greater detail below. However, with reference to FIG. 1, it should be understood that the first housing section 14 and the second housing section 16 are reciprocally mated to one another and form an enclosure within which the various other components, including the base plate 18, are maintained. The housing 12 is preferably sized to be received by a typical tape drive (not shown). Thus, the housing 12 may be sized for use with a 5.25 inch (130 mm) form factor drive, a 3.5 inch (90 mm) form factor drive, or other useful sizes. Further, the first housing section 14 and the second housing section 16 combine to define a head access window 22 through which storage tape (not shown), otherwise maintained within the housing 12, can be accessed by a read/write head (not shown). To this end, the data storage tape cartridge 10 includes a door 24. The door 24 is preferably slidably secured to the housing 12 such that the door 24 can be selectively moved to expose the head access window 22.

In a preferred embodiment, the first housing section 14 forms a cover and the second housing section 16 forms a base. With reference to the orientation shown in FIG. 1, the data storage tape cartridge 10 is normally inserted into a drive (not shown) with the cover 14 facing upward. It should be recognized, however, that the data storage tape cartridge 10 can be oriented to other positions. Further, the design of the data storage tape cartridge 10 can be such that the first housing section 14 forms a base with the second housing section 16 being a cover.

Figure 2:
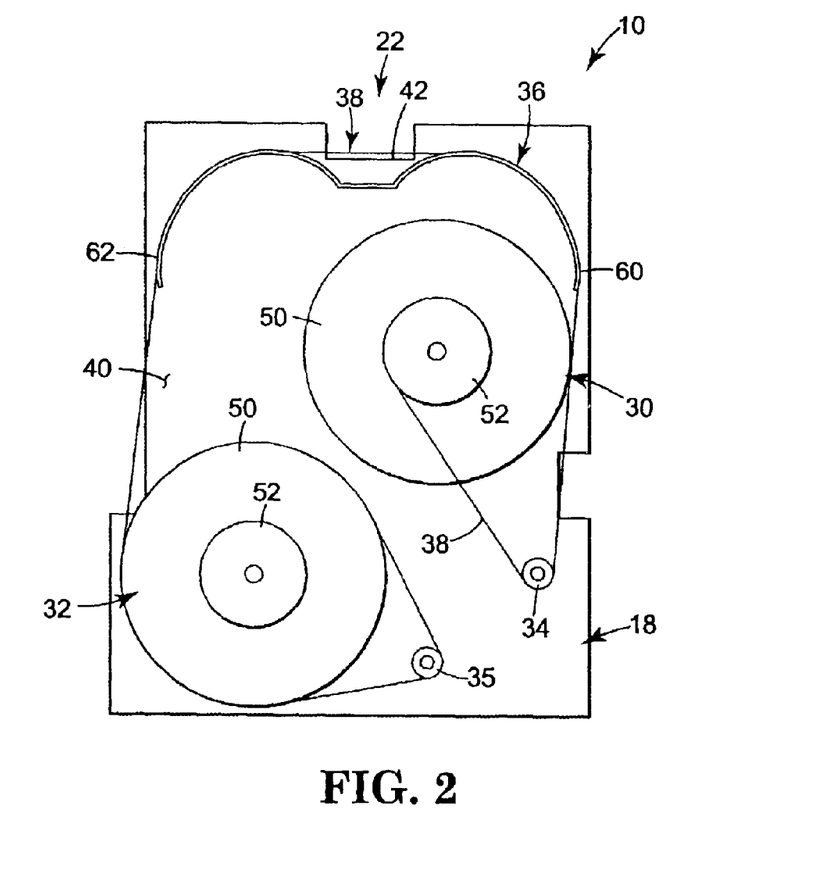
FIG. 2 is a top view of a data storage tape cartridge in accordance with the present invention with the housing removed.

The internal components of one preferred embodiment of the data storage tape cartridge 10 are shown in FIG. 2. Notably, for ease of illustration, the first and second housing sections 14, 16 are removed from the view of FIG. 2. With this in mind, the data storage tape cartridge 10 preferably includes the base plate 18, a first tape reel 30, a second tape reel 32, a first idler wrap guide 34, a second idler wrap guide 35, a tape guide 36, and a storage tape 38. As described in greater detail below, the first tape reel 30 and the second tape reel 32 are rotatably secured about respective hub pins (not shown) extending from an interior surface 40 of the base plate 18.

In a preferred embodiment, the base plate 18 is made of a rigid material, such as aluminum. The base plate 18 is sized to nest within the first housing section 14 (FIG. 1), and defines a head access recess 42 sized to correspond with the head access window 22 (referenced generally in FIG. 2).

The tape reels 30 and 32 are virtually identical and are positioned to rotate relative to the base plate 18 about respective hub pins (not shown). As is known in the art, each of the first and second tape reels 30 and 32 includes opposing reel flanges 50 (a bottom one of which is shown in FIG. 2 and a top one of which is not shown) and a central hub 52. The opposing reel flanges 50 are spaced along the hub 52 in accordance with a width of the storage tape 38. The storage tape 38 wraps around an outer circumference of the hub 52, laterally constrained by the opposing reel flanges 50.

The idler wrap guides 34 and 35 are disposed upon base plate 18 and serve to provide tension to the storage tape 38. In one embodiment, the idler wrap guides 34 and 35 are positioned to provide a tape path of the storage tape 38 between the tape reels 30 and 32 and the tape guide 36. Alternatively, a number of other guide components can be employed for the idler wrap guides 34, 35.

The storage tape 38 is preferably a magnetic tape of a type commonly known in the art. For example, the storage tape 38 may consist of a balanced polyethylene naphthalate (PEN) based material coated on one side with a layer of magnetic material dispersed within a suitable binder system, and on the other side with a conductive material dispersed in a suitable binder system. Acceptable magnetic tape is available, for example, from Imation Corp. of St. Paul, Minn.

As illustrated in FIG. 2, the above components combine to define a tape path for the storage tape 38. In particular, the storage tape 38 extends from the first tape reel 30 and articulates about idler wrap guide 34. From the idler wrap guide 34, the storage tape 38 is directed to the tape guide 36 and extended across the head access recess 42 (and thus the head access window 22). The storage tape 38 extends from the tape guide 36 to the second idler wrap guide 35. The second idler wrap guide 35, in turn, directs the storage tape 38 to the second tape reel 32. The storage tape 38 is wrapped about the central hub 52 of the second tape reel 32.

The tape guide 36 is configured to bias the tape path of the storage tape 38 across the head access window 22, minimizing lateral motion of the storage tape 38. In particular, the tape guide 36 is uniquely configured to bias the tape path to achieve an effective tape path width that is less than the storage tape 38 width. Additionally, the tape guide 36 positions the storage tape 38 relative to the head access window 22 to permit the tape drive to read from, and write to, the storage tape 38. As a result, the tape guide 36 minimizes lateral motion of the storage tape 38 across the head access window 22 by guiding the storage tape 38 through a defined pathway.

Figure 3:
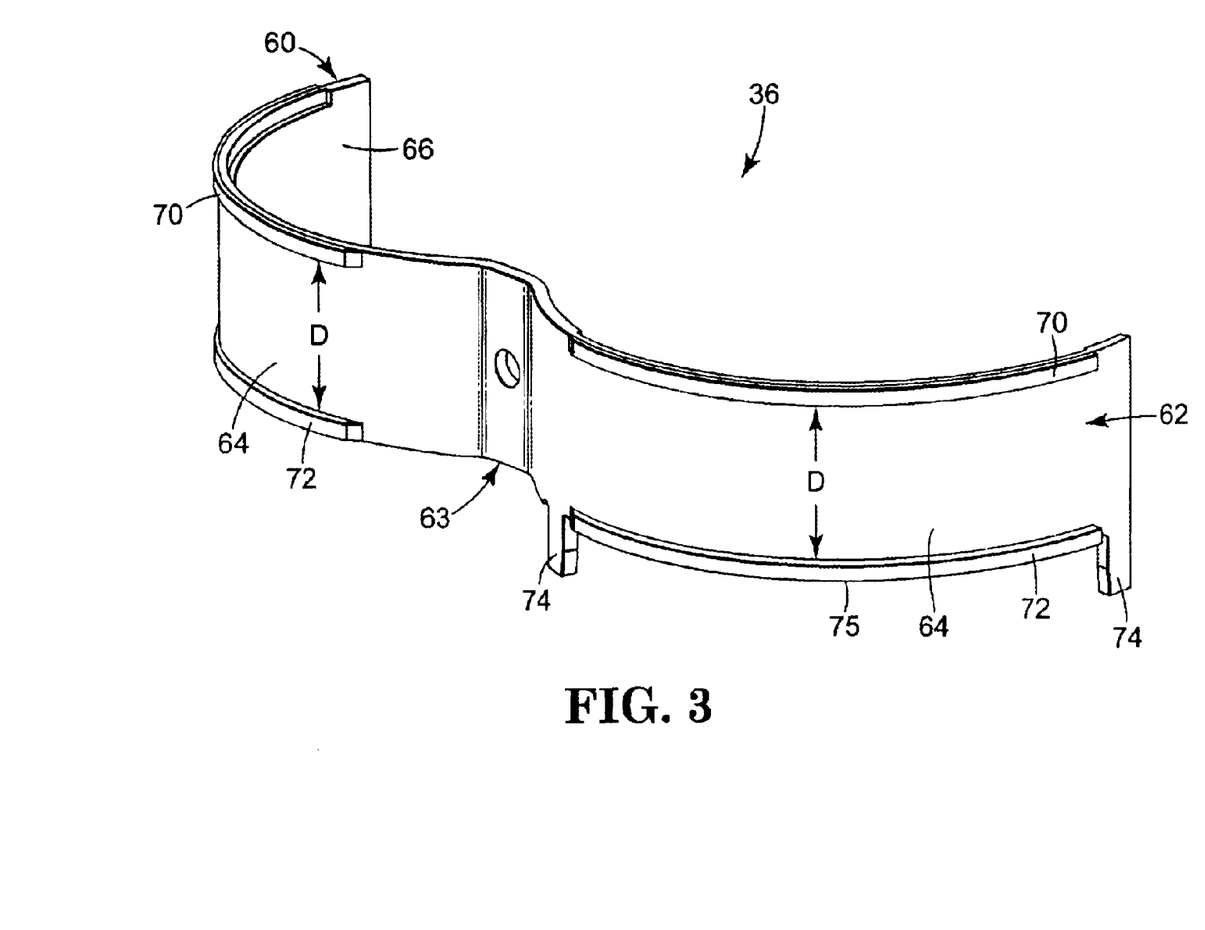
FIG. 3 is a perspective view of one embodiment of a tape guide in accordance with the present invention useful with the data storage tape cartridge of FIG. 2.

FIG. 3 illustrates the tape guide 36 in greater detail. The tape guide 36 includes a first integral corner guide portion 60 and a second integral corner guide portion 62 positioned at opposite sides of a central region 63. The corner guide portions 60, 62 are preferably identical, each defining an arcuate tape contact face 64 and an arcuate back face 66. The respective tape contact faces 64 serve to guide the storage tape 38 (FIG. 2) across the central region 63. To this end, each of the corner guide portions 60, 62 include a top flange 70 and a bottom flange 72, projecting outwardly from opposite sides of the respective tape contact faces 64. As illustrated in FIG. 3, in one embodiment, within each of the corner guide portions 60, 62, the top and bottom flanges 70 and 72 are parallel to each other, spaced by a constant distance D. The spacing distance D is preferably selected to be slightly greater than a width of the storage tape 38, for example, at least 0.002 inches greater. Finally, mounting legs 74 are provided along a bottom edge 75 of the tape guide 36 to enable the tape guide 36 to be coupled to the base plate 18 (FIG. 2), as described below. In general terms, the tape guide 36 is mounted on the base plate 18 such that the tape guide 36 is tilted, causing the pathway of the storage tape 38 to experience a slight vertical shift as it traverses the tape guide 36.

The tape guide 36 may be made from any suitable material including, without limitation, plastics, ceramic, metal, or any combination thereof, in any suitable manner including extrusion, shearing, forming, etc. In one embodiment, the tape guide 36 is made of aluminum and is formed by bending a flat sheet of material in a half-shearing process.

Figure 4:
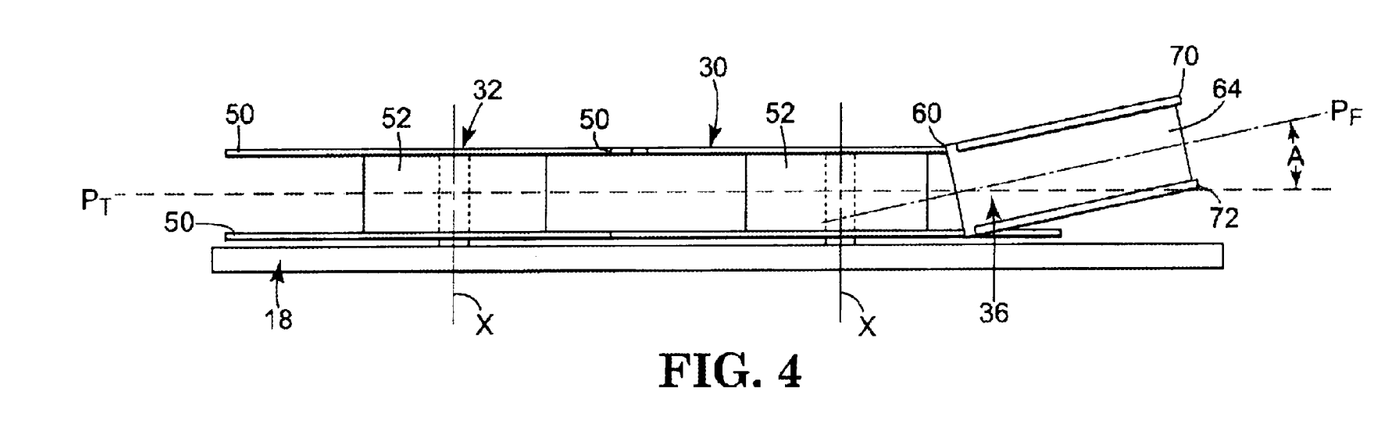
FIG. 4 is a side view of a portion of a data storage tape cartridge including the tape guide of FIG. 3.

Upon final assembly, and with reference to FIG. 4, the tape guide 36 is tilted relative to a position of the tape reels 30, 32 to alter a pathway of the storage tape 38 (FIG. 2). As a point of reference, FIG. 4 illustrates the tape reels 30, 32 assembled to the base plate 18. Assembly of the tape guide 36 relative to the base plate 18 is schematically represented, with a tilted orientation of the tape guide 36 being exaggerated. Each of the tape reels 30, 32 define a central axis X. A transverse tape reel plane $P_T$ is further defined, perpendicular to the central axis X (it should be noted that the transverse tape reel plane $P_T$ is theoretically parallel to the base plate 18 and can be defined relative to any point along a height of the tape reels 30, 32, such that the centered location illustrated in FIG. 4 is but one example). Further, each of the flanges 70, 72 define a flange plane $P_F$ (it being recalled that the flange planes $P_F$ of the flanges 70, 72 are parallel). The flange plane $P_F$ is perpendicular to a plane of the tape contact face 64. For case of illustration, a single flange plane $P_F$ is represented in FIG. 4, mid-way between the flanges 70, 72. With these designations in mind, conventional cartridge designs assemble the tape guide 36 such that the flange plane $P_F$ is parallel with the transverse tape reel plane $P_T$. With the embodiment FIG. 4, however, the tape guide 36 is tilted relative to the central axis X of tape reels 30 and 32 (again, shown in an exaggerated scale to illustrate the bias imparted to the pathway of storage tape 38). More particularly, the tape guide 36 is tilted upward relative to the tape reels 30, 32 such that a tilt angle A is defined between the flange plane $P_F$ and the transverse tape reel plane $P_T$. In a preferred embodiment, the tilt angle A is in the range of 2–10 milliradians. Regardless, the slight tilt effectively results in the flanges 70, 72 defining a transverse curve, due to a differing height rate of change between a front of the tape guide 36 (i.e., adjacent the central region 63) where the height rate of change is relatively low and a back of the tape guide 36 (i.e., section of the corner guide portions 60, 62 opposite the central region 63) where the height rate of change is relatively high.

Figure 5:
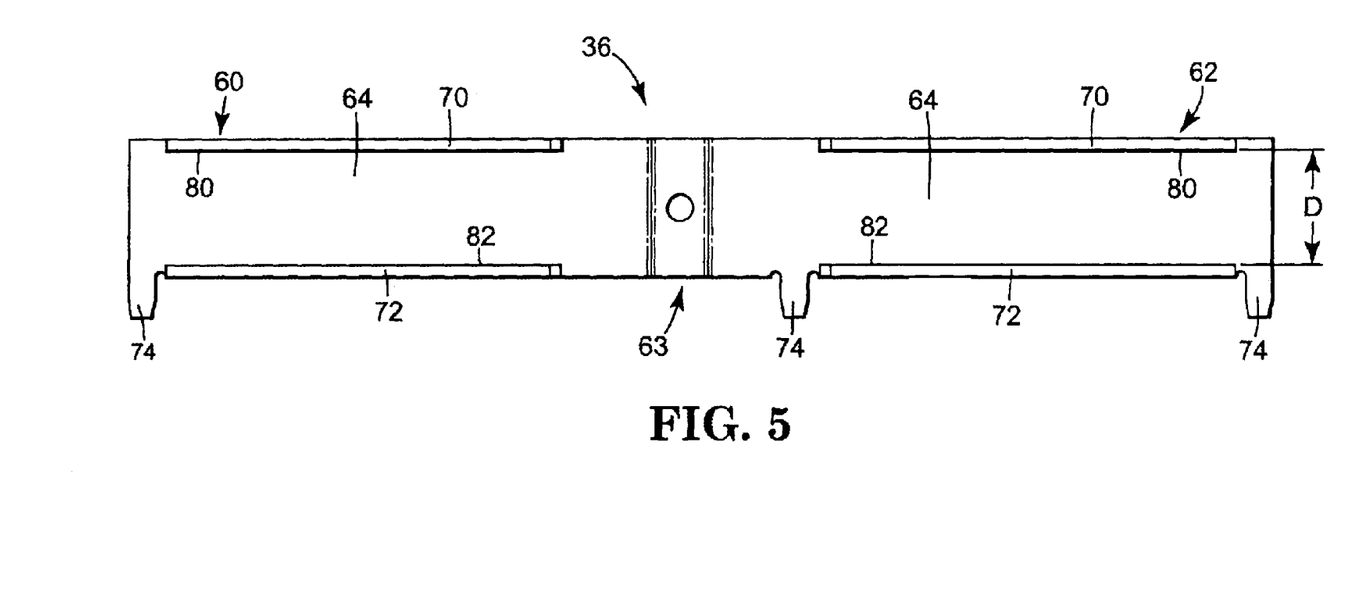
FIG. 5 is a front view of the tape guide of FIG. 3 as a flat sheet before forming.

During use, the storage tape 38 (FIG. 2) pathway is biased by the flanges 70, 72, whereby the above-described tilt effectively forces the storage tape 38 to contact the flanges 70, 72 at desired locations. For example, FIG. 5 illustrates the tape guide 36 in flat form. The tilted assembly (not reflected in FIG. 5) effectively creates a top contact or offset region 80 in the top flanges 70 and a bottom contact or offset region 82 in the bottom flanges 72. The storage tape 38 (FIG. 2) will contact the top offset region 80 in the top flanges 70, that in turn, tend to force the tape path down (or toward the bottom flange 72). Conversely, the bottom offset regions 82 tend to force the tape path up (or toward the top flange 70). As a result, the top and bottom offset regions 80, 82 establish an effective tape path width that is less than a width of the storage tape 38 as the storage tape 38 traverses between the top flange 70 and the bottom flange 72. Thus, the tilted orientation of the tape guide 36, and the resulting tape path bias, controls a height of the storage tape 38 across the head access window 22 and overtly limits lateral motion. Notably, the tape contact face 64 defines and supports a curved tape path between corresponding offset regions 80 and 82 of the respective corner guide portions 60, 62, such that a free span of storage tape 38, that might otherwise experience buckling due to the above-described edge guiding, is not created. In one alternative embodiment, the tape guide 36 is tilted in an opposite direction relative to the tape reels 30, 32 (FIG. 4) such that a negative tilt angle A is created.

Figure 6:
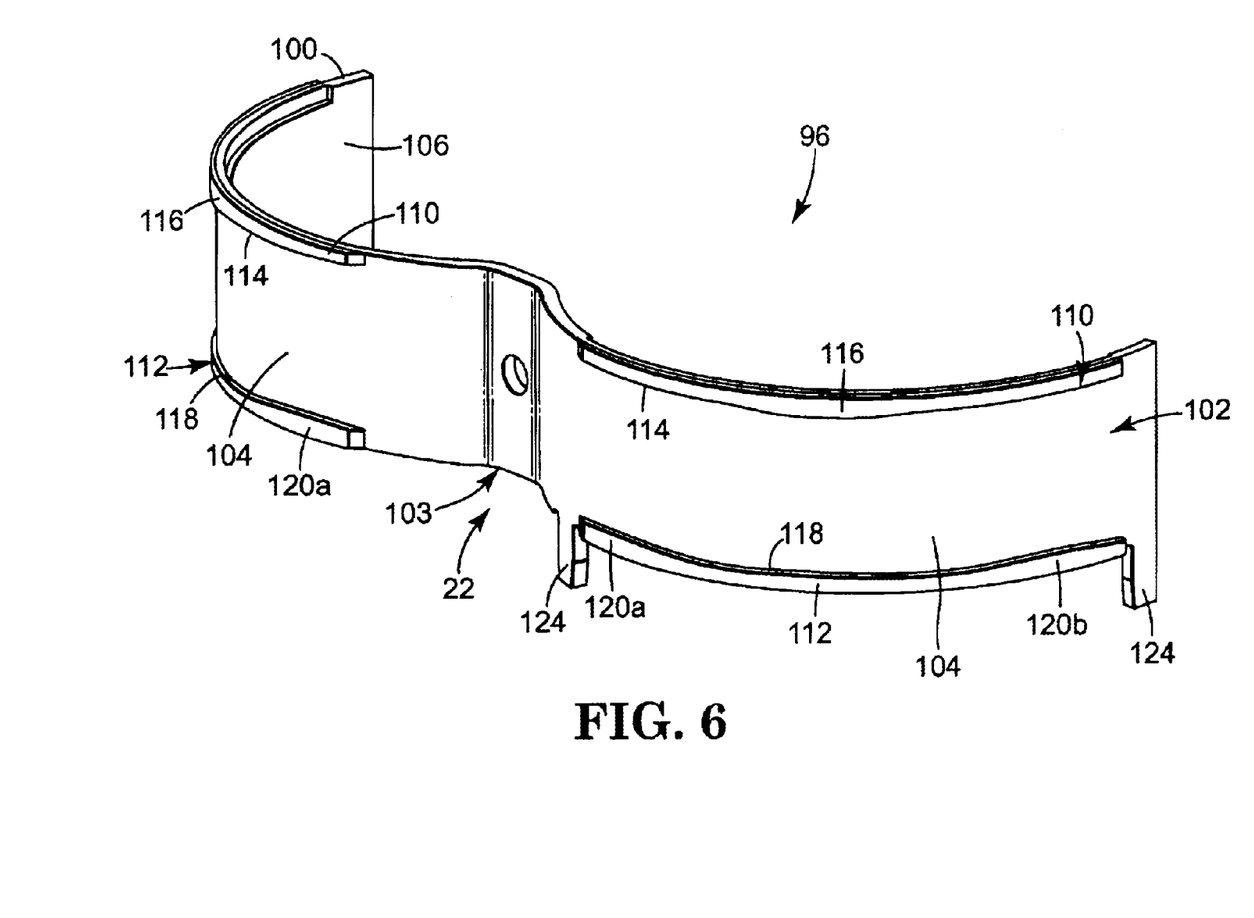
FIG. 6 is a perspective view of another embodiment tape guide in accordance the present invention.

FIG. 6 illustrates an alternative embodiment tape guide 96 in accordance with the present invention. The tape guide 96 includes a first integral corner guide portion 100 and a second integral corner guide portion 102 positioned at opposites sides of a central region 103. Each of the corner guide portions 100, 102 includes an arcuate tape contact face 104, and an arcuate back face 106, a top flange 110 and a bottom flange 112. The top flange 110 projects outwardly relative to the tape contact face 104 and defines an inner surface 114 that is planar along a length of the top flange 110 except in an offset region 116. More particularly, the inner surface 114 along the offset region 116 projects inwardly, or toward the bottom flange 112. Similarly, the bottom flange 112 forms an inner surface 118 that is planar along a length thereof, except in offset regions 120a, 120b formed at opposites ends of the bottom flange 112. The inner surface 118 along the offset regions 120a, 120b projects inwardly, or toward the top flange 110. The top and bottom offset regions 116 and 120a, 120b, respectively, are staggered relative to each other and define a pathway of the storage tape 38 (FIG. 2) across the tape contact face 104. Finally, mounting legs 124 can be included to mount the tape guide 96 on to the base plate 18 (FIG. 2).

Figure 7:
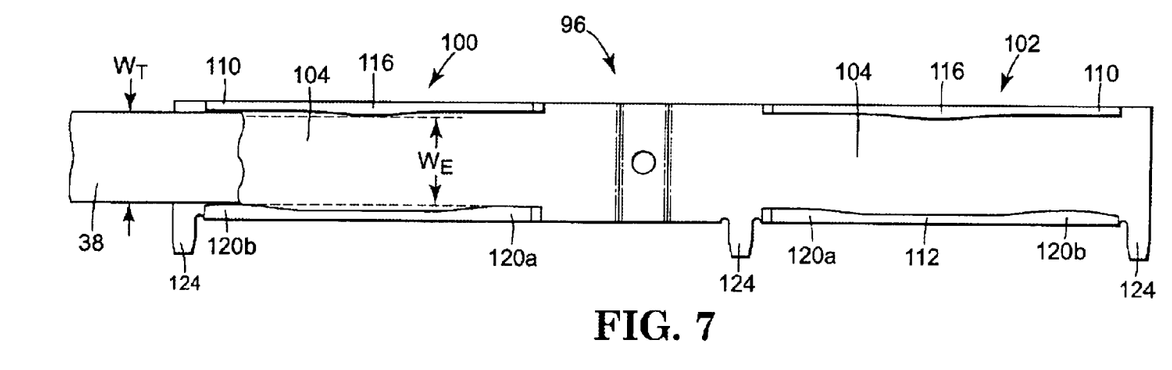
FIG. 7 is a front view of the tape guide of FIG. 6 in flat form before forming in conjunction with a portion of a storage tape.

With additional reference to FIG. 7 (otherwise illustrating the tape guide 96 in a flattened form), the pathway of the storage tape 38 as it articulates across the tape contact face 104 is such that the bottom offset regions 120a, 120b impart an upward shift to the tape path and the top offset flange 116 imparts a downward shift to the tape path. In this way, the storage tape 38 pathway is biased by staggering the positions of the top offset region 116 relative to the bottom offset regions 120a, 120b. In particular, for each of the corner guide portions 100, 102, the relative orientation of the top and bottom offset regions 116 and 120a, 120b, respectively, define an effective tape path width $W_E$. The effective tape path width $W_E$ is defined by the vertical distance between the inner surface 114 of the top offset region 116 and the inner surface 118 of the bottom offset regions 120a, 120b. The tape guide 96 is configured such that the effective tape path width $W_E$ is slightly less than a width $W_T$ of the storage tape 38, with the resulting interference controlling lateral movement of the storage tape 38. For example, when the effective tape path width $W_E$ is less than the width $W_T$ of the storage tape 38 by approximately 0.001 inch, the lateral motion of the storage tape 38 is reduced to less than 100 micrometers. The effective tape path width $W_E$ and thus a difference thereof relative to the tape width $W_T$, is preferably selected to account for manufacturing tolerances on the tape guide 96 and the storage tape 38. A preferred range of the effective tape path width $W_E$ is between 0.001–0.005 inch less than the tape width $W_T$. In a preferred embodiment, the effective tape path width $W_E$ is less than the tape width $W_T$ of the storage tape 38 by 0.003 inch; it has been found that this interference relationship biases the storage tape pathway in a manner that reduces lateral motion of the storage tape 38 to 12 micrometers.

Regardless of exact dimensions of the interference relationship, the tape contact face 104 defines and supports the storage tape 38 across a curved longitudinal path between adjacent ones of the offset regions 120a, 116, and 120b, thereby minimizing the potential for tape buckling in response to the edge guidance. In fact, as compared to offset guidance via multiple, separate tape guides, the tape guide 96 of the present invention can impart an elevated force onto the storage tape 38 edges (and thus greater lateral motion control) with minimal edge wear.

Figure 8:
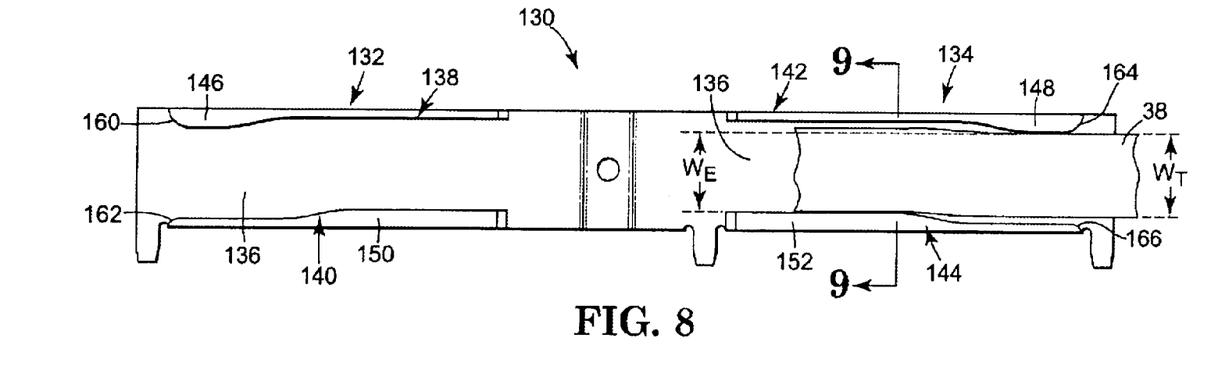
FIG. 8 is a front view of another tape guide in accordance with the present invention in flat form before forming in conjunction with a storage tape.

Yet another embodiment tape guide 130 having flange sections offset to achieve an effective tape path width $W_E$ that is less than the tape width $W_T$ is illustrated in FIG. 8. For ease of illustration, the tape guide 130 is shown in FIG. 8 as a flat sheet, prior to a forming process. The tape guide 130 includes first and second corner guide portions 132, 134 each defining a tape contact face 136. Further, the first corner guide portion 132 includes top and bottom flanges 138, 140 and the second corner portion 134 includes top and bottom flanges 142, 144. The top flanges 138, 142 each define an offset region 146, 148, respectively, the interior surface of which extends toward the corresponding bottom flange 140 or 144. Similarly, each of the bottom flanges 140, 144 define an offset region 150, 152, respectively, the interior surface of which extends toward the corresponding top flange 138 or 142. The offset regions 146 and 150 associated with the first corner guide portion 132 are staggered relative to one another, as are the offset regions 148 and 152 of the second corner guide portion 134. As described below, this configuration forces or biases the storage tape 38 to a consistent, desired transverse height across the tape guide 130, and minimizes the opportunity for lateral movement.

In a preferred embodiment, the first corner guide portion 132 includes a tapered entrance 160 formed on the top flange 138 and a tapered entrance 162 formed on the bottom flange 140. Similarly, the top and bottom flanges 142, 144 of the second corner guide portion 134 form tapered entrances 164, 166, respectively. The top tapered entrances 160 or 164 and the bottom tapered entrances 162 or 166 act as a funnel to escort the storage tape 38 onto the respective tape contact face 136. The tapered entrance pairs 160, 162 and 164, 166 preguide the storage tape 38 as it begins moving along the tape pathway between the top and bottom flanges 138, 140 or 142, 144. This preferred funnel-like formation further restricts lateral motion.

The top flanges 138, 142 and the bottom flanges 140, 144 cooperate to define an effective tape path width $W_E$ that is less than the storage tape 38 width $W_T$ such that a pathway of the storage tape 38 across the tape guide 130 is biased to minimize lateral motion of the storage tape 38. Significantly, at least one offset region, positioned on either the top or bottom flange, will contribute to defining a pathway of the storage tape such that an effective tape path width $W_E$ is less than the storage tape 38 width $W_T$, although each of the flanges 138, 140 can form a multiplicity of offset regions. Regardless, and as previously described, interference defined by a difference between the effective tape path width $W_E$ and the tape width $W_T$ is preferably between 0.001–0.005 inch.

Figure 9:
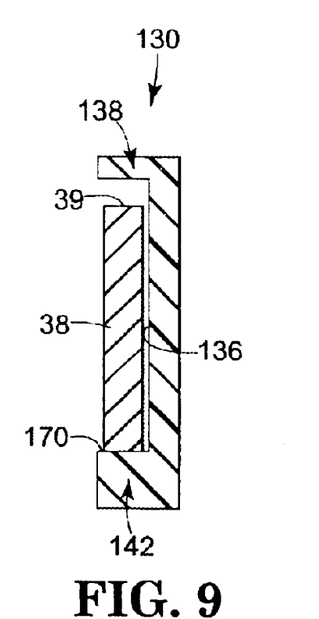
FIG. 9 is a cross-sectional view of the tape guide and storage tape of FIG. 8 taken along the line 9—9.

As described above, the tape guide of the present invention, whether the tape guide 36 (FIG. 3) having parallel flanges or the tape guides 96, 130 having offset flanges, biases the storage tape 38 pathway to minimize the lateral motion of the storage tape 38. The associated flanges are configured to contact and redirect an edge of the storage tape 38. For example, FIG. 9 depicts the tape guide 130, including the top flange 138, the bottom flange 142 and the tape contact face 136. The top and bottom flanges 138, 142 are orthogonal to the tape contact face 136. During use, as the storage tape 38 traverses across the tape contact face 136, the top and bottom offset flanges 138, 142, restrict the lateral motion of the storage tape 38. In particular, FIG. 9 illustrates that the storage tape 38 has been redirected and an edge 170 thereof is in contact with the bottom flange 142. In this way, as the storage tape 38 moves across the central portion of the tape guide 130, the lateral motion of the storage tape 38 is minimized. Lateral motion of the storage tape 38 is preferably limited to less than 100 micrometers, more preferably less than 50 micrometers, and still more preferably less than 30 micrometers. In one preferred embodiment, interference created by a difference between the effective tape path width $W_E$ and the tape width $W_T$ limits lateral tape motion to approximately 12 micrometers.

Magnetic storage media, including data storage tape generally, is abrasive. As the data storage tape 38 moves along the tape guide, for example, the tape guides 36, 96, or 130, the data storage tape contacts the tape guides 36, 96, or 130, and can potentially abrade the surfaces. Consequently, the tape guides 36, 96, or 130 can be protected against wear imparted by the abrasive storage tape 38 media. Therefore, the tape guides 36, 96, or 130 is preferably manufactured from a durable material, such as metal, ceramic, or plastic. Examples of suitable materials for manufacturing the tape guides 36, 96, or 130 include aluminum, steel, stainless steel, polyester, nylon and thermo-formable and curable plastics in general. The durable material that comprises the tape guide 130 is preferably coated to be abrasion resistant. One preferred coating includes an electroless metal coating heat treated to a Rockwell hardness of at least C20.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. For example, while the tape guide has been described as being assembled within a data storage tape cartridge, other tape transport system applications are available. For example, the tape guide of the present invention can be mounted with a tape drive, such as a tape drive used with single reel cartridges, to define a desired tape path. Further, while the tape guide has been illustrated as being an elongated guide having integrally formed corner guide portions positioned at opposite sides of the read/write head, the corner guide portions can instead be provided as separate components, each providing the longitudinally curved tape contact face and opposing top and bottom flanges adapted to define staggered offset provide an effective tape path width that is less than a width of the storage tape.

What is claimed is:

1. A data storage tape cartridge comprising:
a housing defining a head access window;
first and second tape reels rotatably disposed within the housing;
a storage tape having a tape width extending between the first and second tape reels; and
a tape guide disposed within the housing to define a tape path of the storage tape across the head access window, the tape guide including at least one top flange and at least one bottom flange;
wherein an effective tape path width is defined between the top flange and the bottom flange that is less than the tape width such that the top and bottom flanges bias the tape path.

2. The data storage tape cartridge of claim 1, wherein the top and bottom flanges each define an offset region for contacting an edge of the storage tape, the offset regions defining the effective tape path width.

3. The data storage tape cartridge of claim 2, wherein the offset region of the top flange is staggered relative to the offset region of the bottom flange.

4. The data storage tape cartridge of claim 1, wherein the tape guide is tilted relative to the tape reels to generate the effective tape path width.

5. The data storage tape cartridge of claim 4, wherein the tape guide includes opposing corner guide portions positioned at opposite sides of the head access window, the corner guide portions each including top and bottom flanges projecting from a tape contact face thereof, the top and bottom flanges being parallel.

6. The data storage tape cartridge of claim 5, wherein a tilt angle is defined between the tape guide and the tape reels, the tilt angle being in the range of 2–10 milliradians.

7. The data storage tape cartridge of claim 1, wherein the top flange defines an offset region that projects toward the bottom flange, and the bottom flange defines an offset region that projects toward the top flange, the offset regions combining to define the effective tape path width.

8. The data storage tape cartridge of claim 7, wherein the tape guide includes opposing corner guide portions each including one top flange forming the offset region and one bottom flange forming the offset region.

9. The data storage tape cartridge of claim 7, wherein the top flange includes an inner surface that is planar except along the offset region.

10. The data storage tape cartridge of claim 7, wherein the offset region of the top flange is staggered relative to the offset region of the bottom flange.

11. The data storage tape cartridge of claim 7, wherein the bottom flange forms at least two of the offset regions.

12. The data storage tape cartridge of claim 11, wherein the offset region of the top flange is staggered relative to the at least two offset regions of the bottom flange.

13. The data storage tape cartridge of claim 1, wherein the effective tape path width is at least 0.001 inch less than the storage tape width.

14. A tape guide for use in a tape drive system for guiding a storage tape having a tape width, the tape guide comprising:
a corner guide portion;
an arcuate tape contact face formed within the corner guide portion; and
top and bottom flanges projecting from opposite sides of the tape contact face;
wherein the top flange defines a top offset region and the bottom flange defines a bottom offset region, the top and bottom offset regions combining to define an effective tape path width that is less than the width of the storage tape.

15. The tape guide of claim 14, wherein the top and bottom offset regions of the corner guide portion are staggered relative to one another.

16. The tape guide of claim 14, wherein the offset regions are defined as inward extensions of the respective flange relative to a center of the tape contact face.

17. The tape guide of claim 16, wherein at least one of the top and bottom flanges forms a plurality of offset regions.

18. The tape guide of claim 16, wherein the top and bottom flanges are nonparallel.

19. A method of guiding a storage tape within a tape drive system including a read/write head, the method comprising:
positioning a tape guide adjacent the read/write head, the tape guide including a tape contact face, a top flange, and a bottom flange;
articulating the storage tape along the tape contact surface such that the read/write head interacts with the storage tape; and
biasing a tape path of the storage tape along the tape guide by causing the storage tape to contact the top flange and the bottom flange at staggered locations in front of a position of the read/write head, relative to a direction of travel of the storage tape.

20. The method of claim 19, wherein the tape guide includes first and second corner guide portions located at opposite sides of the read/write head, and further wherein each of the corner guide portions includes the top flange forming an offset region and the bottom flange forming an offset region.

* * * * *